STRESS RELIEVED THIN MAGNETIC FILMS
Filed Jan. 23, 1958
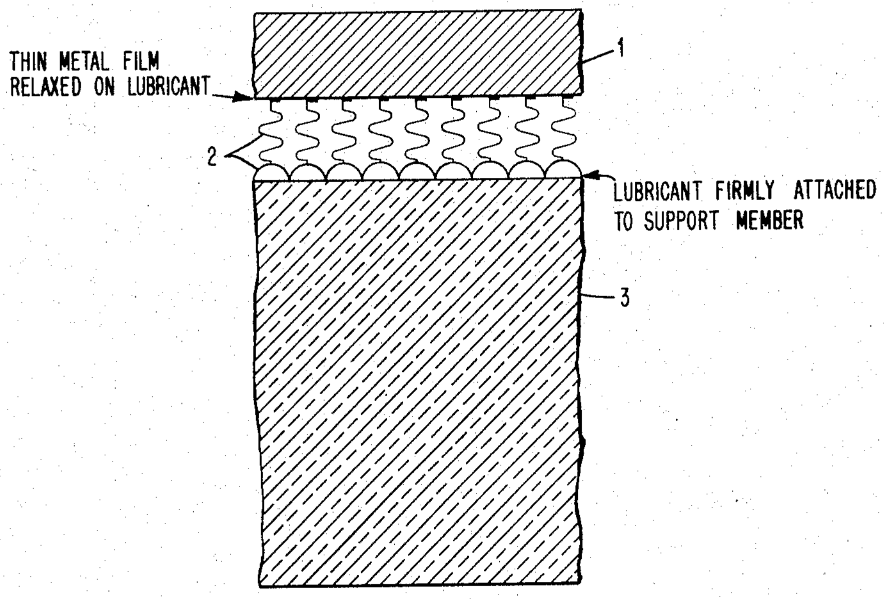
INVENTORS
ROBERT S. SMITH
JOHN S. EGGENBERGER
KENNETH B. SCOW
BY
William V. Schelberg
AGENT United States Patent Office 2,907,680

Patented Oct. 6, 1959

2,907,680

STRESS RELIEVED THIN MAGNETIC FILMS

Robert S. Smith and John S. Eggenberger, Poughkeepsie, and Kenneth B. Scow, Wappingers Falls, N.Y., assignors to International Business Machines Corporation, New York, N.Y., a corporation of New York Application January 23, 1958, Serial No. 710,802

12 Claims. (Cl. 117—71)

The present invention relates to thin magnetic films and in particular to a method by which such films may be prepared with a minimum of stress arising from reaction between the film and a substrate upon which it is supported. Even more particularly, it pertains to the treatment of film support members wherein they are rendered more suitable for the reception of thin magnetic layers.

Recent research investigations have revealed that in certain respects properly prepared thin magnetic alloys behave in a similar manner as the non-metallic substances known as the ferro-magnetic ferrites. In particular, these magnetic alloys exhibit the rectangular or square hysteresis loops and rapid domain reversal commonly associated with these materials. Thin films of magnetic alloys are, therefore, adaptable for use as magnetic memory storage devices and for other applications in computer circuitry. It has been shown, for example, that if a ferromagnetic layer is sufficiently thin, of the order of 3000 angstroms or less, it is energetically unfavorable for the layer to comprise large and preferentially oriented magnetic domains. The hysteresis loop of such a film is observed to be rectangular when the direction of easy magnetization is parallel to the drive field. The preparation and general properties of thin metallic films have been described in detail by Blois in the Journal of Applied Physics, volume 26, August 1955, pages 975–980. In general thin magnetic films are produced by high vacuum evaporation of metal alloys onto suitable support substrates. Such evaporation may be advantageously carried out by heating tungsten filaments on which are plated or wound wire or ribbon containing predetermined amounts of the metallic constituents of the thin films. Iron and nickel in various percentages have been used as magnetic materials. In practice, a wide range of values of magnetic properties have been observed in such magnetic films, particularly in regard to the coercive forces. General practice is to attempt to align the magnetization along some desired direction by imposing a field during evaporation. It is very often observed, however, that the easy axis is randomly oriented. Similar difficulties have appeared also where electroplated films were prepared for the same purpose.

The behavior described above is believed to be due to the fact that thin magnetic metal films produced from high vacuum or by electrodeposition orient themselves in a state of relatively high tensile stress. Stress can arise from interaction between the film and its substrate which causes the first atomic layers of the film to assume the structure of the substrate. It also may be due to thermal expansion between the substrate and the film which introduces stresses as the films are cooled after evaporation. Another theory of the origin of stress was advanced by Hoffmann, Daniels, and Cittenden, reporting in the Proceedings of the Physical Society B, volume 64, pages 497–500 (1954). The authors regard the major component of stress as arising from the lattice vacancies within the crystals introduced by the evaporation process. These imperfections undergo changes at the substrate temperature and then cannot anneal properly because of the immobility of subsequent adhering film layers. As a practical matter, however, adherence of the film to the substrate is absolutely necessary to prevent the film from peeling off. This stress condition may be relieved in part by depositing metallic layers onto a support layer which is maintained at elevated temperatures. Heating the substrate increases the surface mobility of the arriving atoms and decreases the probability of adjustment at abnormal surface sites and produces a lower initial imperfection density.

In the aforementioned prior art processes, the thin films that have been prepared have non-uniform magnetic characteristics believed to arise from the variant stress conditions in the films as described.

This invention is based upon a discovery that thin metallic films which are vacuum deposited onto a support member which has been pretreated with a smooth layer of lubricating adhesive have reproducible magnetic properties and lower values of coercive force.

An object of this invention is to provide a method by which stress conditions in thin magnetic film can be reduced to a minimum.

Still another object of this invention is to prepare rectangular hysteresis loop thin magnetic films in which the orientation of the direction of easy magnetization remains constant throughout the film.

A specific object of this invention is to make thin magnetic films which have lower coercive forces.

Among the other objects of this invention is to prepare computer elements which have reproducible magnetic characteristics.

Other objects of the invention will be pointed out in the following description and claims and illustrated in the accompanying drawings, which disclose, by way of example, the principle of the invention and the best mode, which has been contemplated, of applying that principle.

In the drawings, the single figure shows a schematic representation of the arrangement of the several member layers forming the thin magnetic film device.

In accordance with the invention liquids which have been used as stress-relieving agents have a strong tendency to wet the substrate and to spread out over the surface uniformly rather than to collect as droplets. The liquids are non-reactive with the support and remain fluid over a wide range of temperatures from below room temperature to above 300° C. In operation the liquids adhere to the support material and the film so that the film does not peel off and yet spontaneously stretches and contracts to relieve the stressed areas. Since the lubricant must remain in the liquid state during the deposition process, inert fluids whose molecular layer on the substrate has a low vapor pressure at the temperature of vapor deposition are preferred. The nature of the action of the lubricated surface is that it presents a yielding medium to which the metallic film will stick but yet on which it feels free to relax. As an example of suitable liquids which applicant has found to be effective are the phthalate diesters. Another liquid which is particularly effective as a lubricant is kerosene.

The substrate material according to this invention may be any glass, plastic, or other material which is flat, capable of being properly annealed, and which does not interact with the lubricant or the metal layer. Ordinary glass appears well suited from the standpoint of reproducibility of physical characteristics.

Referring now to the figure, the supporting substrate is designated by the label 1, the lubricant layer by label 2 and the thin layer of metallic alloy by 3. In the form illustrated this structure represents a workable switching element that may be used in computer mechanisms when appropriate driving fields and windings are arranged in inductive relationships thereto.

A typical preparation of thin magnetic films following the practice of this invention comprises immersing a glass slide in a suitable chemical solution to remove foreign matter therefrom, rinsing in distilled water, draining dry, further cleaning by ultrasonic treatment, applying a molecular layer of a stress relieving lubricating agent to the glass substrate, placing the treated substrate in a suitable vacuum system apparatus and depositing thereon a thin magnetic film by the process of thermal evaporation.

*Example I*

Following the steps described above, a layer of di-2-ethylhexyl phthalate was applied to one end of an ultrasonically cleaned glass slide while the other end was left untouched. The slide was maintained at a temperature of 100° C. while a nickel-iron alloy consisting of 80 percent nickel and 20 percent iron was deposited under $10^{-6}$ mm. Hg pressure from a heated filament containing these metals at a rate of about 60 A. per second. The thin magnetic films thus produced on the untreated end of the slide showed a coercive force of 50 oersteds, a strong tendency to peel and poor magnetic orientation. The lubricated end showed a coercive force of only 6 oersteds and a uniform alignment of the easy direction of magnetization. Different regions of the film in the treated end of the slide showed almost nearly identical values of coercivity.

*Example II*

Following the steps described above a layer of kerosene was applied to one end of an ultrasonically cleaned glass slide while the other was left untouched. The slide was heated at 100° C. while a nickel-iron alloy consisting of 80 percent nickel and 20 percent iron was deposited as before. The thin magnetic films thus produced in the untreated end of the slide again showed the same characteristics as in Example I. The lubricated end showed a coercive force of 3.5 oersteds and good magnetic orientation.

The lubricant layer in the thin magnetic film device of the present invention serves to decrease the real area of contact between the substrate and metal film, replacing such areas by coatings having a lower adhesion to each other. The lubricant thus acts as an intermediary in preventing stress conditions from developing, as in previous devices of this type.

While we have shown several suitable liquids, the invention may be practiced with any polar organic compound which satisfies the criteria prescribed above and which, in particular, wets the support surface to form a smooth layer. Furthermore, mixtures of such polar molecules and long chain hydrocarbons, as exemplified by the commercial product known as kerosene, are effective stress relieving agents. The wetting characteristics of a large number of such compounds and mixtures thereof have been described and may be readily obtained upon examination of the technical literature.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limied only as indicated by the scope of the following claims.

What is claimed is:

1. As an article of manufacture, a magnetic device suitable for use in computer type mechanisms, comprising in combination, a thin magnetic film, a support member, and a smooth molecular layer of lubricating material possessing polar and non-polar groups therein intermediate said film and support member, said layer being wetted to said support member and non-reactive therewith, said layer also being non-volatile at low pressures, said device exhibiting uniform magnetic properties.

2. The article according to claim 1 wherein said lubricant layer consists essentially of di-2-ethylhexyl phthalate.

3. The article according to claim 1 wherein said lubricant layer consists essentialy of kerosene.

4. The article according to claim 1 wherein said thin magnetic film consists essentially of an iron-nickel alloy.

5. The article according to claim 1 wherein said support member is glass.

6. As an article of manufacture, a magnetic device suitable for use in computer type mechanisms, comprising in combination, a thin magnetic film, a support member, and a smooth molecular layer of lubricating material possessing polar and non-polar groups therein intermediate said film and support member, said layer being wetted to said support member and non-reactive therewith, said layer having a high boiling point at low pressures, said device exhibiting uniform magnetic properties.

7. A method of making thin magnetic films having substantially uniform magnetic properties and low coercive forces, comprising the steps of adsorbing a lubricating liquid onto a cleaned support member, said liquid possessing polar and non-polar groups therein forming a smooth molecular layer of said liquid, said layer having a high boiling point at low pressures and being wetted to and non-reactive with said support member, and depositing a thin magnetic film thereon by vacuum evaporation.

8. A method of making thin magnetic films having substantially uniform magnetic properties and low coercive forces, comprising the steps of adsorbing a lubricating liquid consisting essentially of a polar organic compound onto a cleaned support member, forming a smooth molecular layer of said liquid, said layer having a high boiling point at low pressures and being wetted to and non-reactive with said support member and depositing a thin magnetic film thereon by vacuum evaporation.

9. The method according to claim 8 wherein said lubricant layer consists essentially of di-2-ethylhexyl phthalate.

10. The method according to claim 8 wherein said layer consists essentially of kerosene.

11. The method according to claim 8 wherein said thin magnetic coating consists essentially of an iron-nickel alloy.

12. The method according to claim 8 wherein said support member is glass.

References Cited in the file of this patent

UNITED STATES PATENTS

| | | |
|---|---|---|
| 2,139,640 | Mall et al. | Dec. 6, 1938 |
| 2,185,300 | Hickman | Jan. 2, 1940 |
| 2,273,704 | Grisdale | Feb. 17, 1942 |
| 2,700,623 | Hall | Jan. 25, 1955 |
| 2,734,033 | Menard | Feb. 7, 1956 |
| 2,794,180 | Berger et al. | May 28, 1957 |

FOREIGN PATENTS

| | | |
|---|---|---|
| 670,993 | Great Britain | Apr. 30, 1952 |